Jan. 14, 1969  R. C. PETERSON ET AL  3,421,850
SEPARATE RECOVERY OF COPPER SULFIDE AND ZINC SULFIDE
FROM AQUEOUS SOLUTIONS CONTAINING WATER-SOLUBLE
SALTS OF COPPER AND ZINC
Filed July 2, 1965
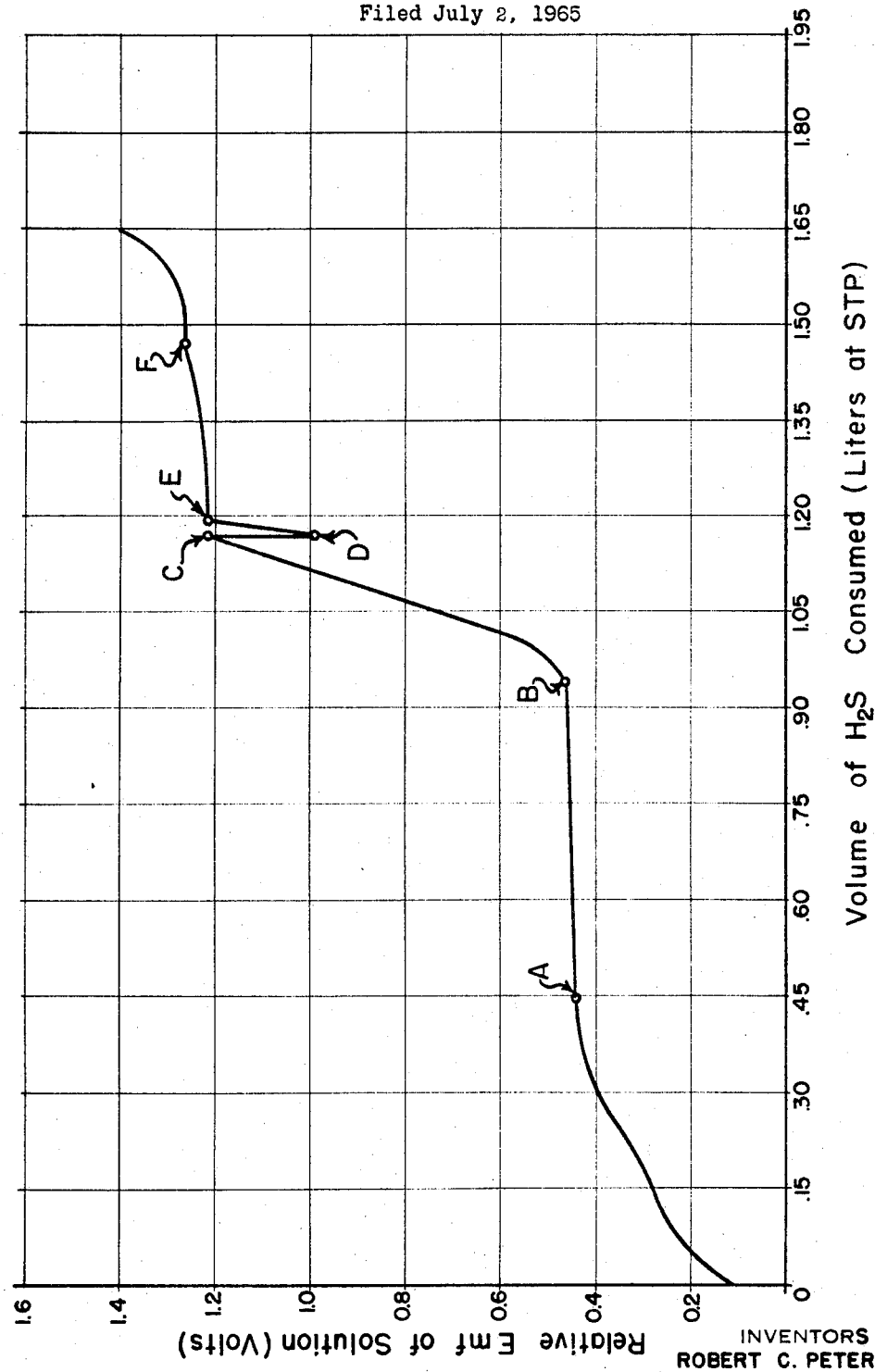
INVENTORS
ROBERT C. PETERSON
HERMAN M. MAASS
BY
ATTORNEYS United States Patent Office 3,421,850
Patented Jan. 14, 1969

3,421,850
SEPARATE RECOVERY OF COPPER SULFIDE AND ZINC SULFIDE FROM AQUEOUS SOLUTIONS CONTAINING WATER-SOLUBLE SALTS OF COPPER AND ZINC
Robert C. Peterson and Herman M. Maass, Anaconda, Mont., assignors to The Anaconda Company, a corporation of Montana
Filed July 2, 1965, Ser. No. 469,145
U.S. Cl. 23—135      7 Claims
Int. Cl. C01g 3/12; C0g 9/08

ABSTRACT OF THE DISCLOSURE

Copper sulfide and zinc sulfide are recovered separately from an aqueous solution containing both copper and zinc dissolved therein. Copper sulfide is first precipitated from the solution by first adjusting the pH of the solution to below about 3.5 and then adding hydrogen sulfide gas to the solution until the solution EMF changes abruptly, whereupon the addition of $H_2S$ is stopped and the precipitated copper sulfide is recovered from the solution. Zinc sulfide is then precipitated from the solution by adjusting the solution pH to between about 3.5 and 5.5 and then again adding $H_2S$ gas until the solution EMF again changes abruptly, whereupon the addition of $H_2S$ is again stopped and the precipitated zinc sulfide is recovered from the solution.

In the course of mining and beneficiating copper ores and zinc ores, and ores which contain both of these metals, and in the course of extracting and recovering the copper and zinc values of such ores, large quantities of copper-containing and/or zinc-containing aqueous solutions are produced either deliberately or as an incident of the mining and metallurgical treatment of the ores. Referring now, merely for the purpose of illustration, only to copper-containing aqueous solutions, if the copper content of a solution thus produced is sufficiently high, the copper can be economically recovered therefrom by electrochemical techniques. However, if the copper content of the aqueous solution is too low to be economically recovered by electrolytic means, the copper is ordinarily precipitated from the solution by contacting it with scrap iron or sponge iron, or by reacting it with calcium polysulfide, and by similar techniques known to the industry. The low-grade copper-containing solution is ordinarily contacted with the precipitating material by flowing the solution over or through a bed of the material, or by mixing it with an aqueous suspension of the material. After the copper has been precipitated it is then recover from the bed or other medium for subsequent treatment. However, although this conventional procedure is relatively inexpensive and uncomplicated, it is not always as efficient or trouble-free as might be desired. Analogous problems are encountered in the recovery of zinc from low-grade zinc-containing solutions, and this has led to a search for other, more satisfactory, procedures for the recovery of copper and zinc values from low-grade solutions of these metals.

It is known that copper and zinc can be recovered as sulfides from aqueous solutions of copper and zinc salts by treatment of the solution with hydrogen sulfide to precipitate the copper and zinc in the form of the sulfides of these metals. However, hydrogen sulfide has never been successfully employed commercially to recover copper and zinc values from solutions containing these metals because of the noxious fumes commonly associated with hydrogen sulfide and the poisonous character of these fumes. That is to say, it has heretofore been the experience of those skilled in this art that when sufficient hydrogen sulfide is introduced into the copper- and/or zinc-bearing solution to insure that all of the copper and zinc values thereof are precipitated as their respective sulfides, an excess of hydrogen sulfide will evolve from the solution and contaminate the surrounding atmosphere. Moreover, it has also been the experience of workers in this art that when the solution contains both water-soluble copper salts and water-soluble zinc salts, the addition of hydrogen sulfide thereto will precipitate both copper sulfide and zinc sulfide at the same time, and the separation of the mixed precipitate into its component metal sulfides is a time consuming and costly procedure.

We have now discovered that, by appropriate control of reaction conditions, it is possible to employ hydrogen sulfide as a precipitant for substantially all of the copper values of copper-containing aqueous solutions, and also as a precipitant for substantially all of the zinc values of zinc-containing solutions, without experiencing the noisome and wasteful evolution of hydrogen sulfide from the solution. In particular, we have discovered that, when hydrogen sulfide is introduced into a copper-containing solution to precipitate the copper therefrom, and also when this gas is introduced into a zinc-containing solution to precipitate the zinc therefrom, the electromotive force of the solution, as measured by the EMF existing between two dissimilar electrodes immersed in the solution, changes abruptly when the copper content or the zinc content of the solution has been substantially completely precipitated therefrom in the form of copper sulfide or zinc sulfide, as the case may be. Moreover, we have found that if the introduction of hydrogen sulfide is stopped when this abrupt change in the EMF of the solution occurs, little if any of the gas will evolve from the solution despite substantially complete precipitation of the copper or zinc content thereof. We have further found that by appropriate control of the hydrogen ion concentration (or pH) of the solution, it is possible to precipitate copper sulfide and zinc sulfide separately and substantially quantitatively from an aqueous solution containing both water-soluble copper and water-soluble zinc salts without significant evolution of hydrogen sulfide from the solution.

Accordingly, based on these and other discoveries hereinafter more fully discussed, we have now developed a new process for the recovery of copper and zinc separately from aqueous solutions containing water-soluble copper salts and/or water-soluble zinc salts which comprises first adjusting the hydrogen ion concentration of the solution so that the pH of the solution is below about 4.0, and preferably is below about 3.5. The electromotive force of the aqueous solution is continuously monitored by measuring the EMF that exists between dissimilar electrodes immersed in the solution, and hydrogen sulfide is continuously introduced into the solution in order to precipitate the copper content thereof in the form of copper sulfide. The introduction of hydrogen sulfide into the solution is continued until the EMF of the solution changes abruptly, whereupon the addition of hydrogen sulfide is discontinued. The precipitated copper sulfide is separated and recovered from the solution by filtration, flotation, settling, or like procedures. The hydrogen ion concentration of the solution is then adjusted so that the pH of the solution is between about 3.5 and about 5.5, and the introduction of hydrogen sulfide into the solution is thereupon resumed in order to precipitate the zinc content thereof in the form of zinc sulfide. Hydrogen sulfide is continuously introduced into the solution until the EMF of the solution again changes abruptly, whereupon the addition of the gas is again discontinued. The zinc sulfide precipitated in the second precipitation step of the process is then separated and recovered from the solution by any suitable procedure.

It is well known that aqueous solutions of copper salts and zinc salts will produce a characteristic electromotive force when placed between an inert electrode (such as a platinum electrode) and a standard reference electrode (such as a calomel electrode). The electromotive force generated by such a cell, as measured by the potential difference existing between the reference and inert electrodes when immersed in the electrolyte, depends largely upon the composition of the electrolyte and the type of reference and inert electrodes used. However, although the EMF of a particular combination of electrolyte and electrodes may differ from the EMF of another combination of electrolyte and electrodes, the EMF of each combination is essentially reproducible and remains essentially constant as long as the composition of the electrolyte and the electrodes remain essentially the same.

We have discovered that the EMF of solutions of copper salts (in the absence of other ions which are more easily reduced than copper or more easily precipitated from the standpoint of the prevailing chemical equilibrium) remains substantially constant, or, at most, changes only slowly at a fairly uniform rate as hydrogen sulfide is introduced into the solution. The uniform, slow change in the EMF of the solution when measured with a standard reference electrode and a concomitant inert electrode is due to the change in the composition of the electrolyte as a result of the depletion of copper ions from the solution and the introduction of hydrogen ions into the solution according to the reaction:

$$Cu^{++} + H_2S \rightarrow CuS + 2H^+$$

As the addition of hydrogen sulfide continues and the precipitation of copper sulfide approaches substantial completion, the EMF of the solution changes abruptly, and this abrupt change in the potential of the solution is a reliable indication that substantially all of the copper has precipitated in the form of copper sulfide and that the introduction of hydrogen sufide into the solution should be terminated. In like manner, we have discovered that the EMF of solutions of zinc salts increases slowly at a fairly uniform rate as hydrogen sufide is introduced into the solution due to the decrease in zinc ions and the increase in hydrogen ions present in the solution as a result of the reaction:

$$Zn^{++} + H_2S \rightarrow ZnS + 2H^+$$

As the addition of hydrogen sulfide continues and the precipitation of zinc sulfide approaches substantial completion, the EMF of the solution changes abruptly from the aforementioned gradual increase to a level (or essentially unchanging EMF) plateau, and this abrupt change is a reliable indication that substantially all of the zinc has been precipitated in the form zinc sulfide and that the introduction of hydrogen sulfide into the solution should be terminated. We have also discovered that the precipitation of copper sulfide will take place in more acidic solutions than will the precipitation of zinc sulfide, and that by appropriate adjustment of the pH of the solution selective precipitation of copper sulfide or zinc sulfide can be achieved. Thus, the basic procedural technique involved in our process comprises first adjusting the pH of the solution to a predetermined value, and then continuously measuring the electromotive force of the solution while introducing hydrogen sulfide thereinto and, based on these EMF measurements, controlling the addition of hydrogen sulfide into the solution so that the addition of the gas will be stopped just short of a theoretically complete precipitation of the copper content or the zinc content of the solution, as the case may be.

The aforementioned technique can be employed to recover copper from copper-containing solutions, zinc from zinc-containing solutions, or copper and zinc separately from aqueous solutions containing both of these metals. As previously indicated, the separate precipitation of copper and zinc in the form of their corresponding sulfides is very largely dependent upon the acidity of the solution from which this precipitation takes place. Specifically, we have found that when the pH of a copper-containing solution is below about 4.0, the copper content of the solution will be precipitated substantially quantitatively therefrom in the form of copper sulfide when hydrogen sulfide is introduced into the solution. Moreover, we have found that when the pH of the solution is permitted to exceed about 4.0, copper will commence to precipitate therefrom in the form of basic copper salts. In like manner, we have found that when the pH of a zinc-containing solution is below about 3.5, little or no zinc will precipitate therefrom when hydrogen sulfide is added to the solution. However, when the pH of the solution is maintained between about 3.5 and 5.5, the zinc content of the solution will precipitate substantially quantitatively therefrom in the form zinc sulfide on the addition of hydrogen sulfide to the solution. Therefore, in the separate precipitation of copper sulfide and zinc sulfide from aqueous solutions in accordance with the practice of our invention, the pH of a solution is first adjusted (by the addition of an acid thereto, if necessary) so that the pH is below about 4.0, and preferably below about 3.5 if the precipitation of zinc sulfide is to be avoided. On completion of the precipitation of the copper content of the solution, and on removal of the copper sulfide precipitate from the solution, the pH of the solution is then adjusted (by the addition of a basic compound such as sodium hydroxide, ammonium hydroxide, milk of lime, or the like to the solution) to bring the pH of the solution to within the range of from about 3.5 to about 5.5. The addition of hydrogen sulfide gas to a zinc-containing solution having a pH within this range will result in substantially quantitative precipitation of the zinc in the form of zinc sulfide.

If, as is usually the case, the copper-containing solution also contains salts of other metals besides copper dissolved therein, and if the oxidation reduction potential of the ions of some of these other metals is such that they will be reduced before copper precipitates as copper sulfide, hydrogen sulfide will be consumed in proportion to the amount of such more-easily-reduced ions present in the solution. Moreover, when the reduction of these more-easily-reduced ions along with the precipitation of less soluble metallic sulfide ions than the $Cu^{++}$ ion is complete, the EMF of the solution will change to correspond to the EMF potential which is characteristic of the changed composition of the electrolyte. For example, copper-containing leach liquors ordinarily contain appreciable amounts of ferric sulfate. In the initial stages of the addition of hydrogen sulfide to such leach liquors, the ferric ions are reduced to the ferrous state with the consumption of a quantity of hydrogen sulfide corresponding to the quantity of ferric iron initially present in the solution. Moreover, as the ferric iron is reduced to ferrous iron, the EMF of the solution changes comparatively rapidly until all of the iron is present in the lower valent state. The EMF of the solution then levels off at a relatively constant value until the precipitation of the copper content thereof approaches completion.

The presence of ferric and/or ferrous ions in the copper-containing solution present further complications which must be taken into consideration in the practice of our process. When the solution contains ferric ions, basic ferric salts commence to precipitate from the solution when the pH of the solution exceeds about 3.0. Moreover, when the solution contains ferrous ions, ferrous sulfide commences to precipitate from the solution should the pH of the solution be permitted to exceed about 6.0 when the hydrogen sulfide is being introduced in the solution. As a result, it is important that the pH of the solution be maintained below about 3.0 as long as it contains any ferric iron, and that it be maintained below about 6.0 in any case in order to prevent the precipitation of ferrous sulfide.

It is recognized that the change in potential of the EMF of a copper-containing or a zinc-containing solution can be measured in different ways. The EMF values measured against a standard reference electrode are by the necessity of electrochemical equilibria only relative values. The single figure of the accompanying drawing shows graphically the change in the relative EMF of a typical copper and zinc bearing solution as hydrogen sulfide is added continuously to the solution.

The drawing shows graphically the relationship between the EMF of a typical copper leach solution and the quantity of hydrogen sulfide introduced thereinto, and is based on continuous measurement of the EMF of the solution during the addition of hydrogen sulfide into the solution. The copper leach liquor contained 1.81 grams per liter (gm./l.) of copper essentially all in the form of dissociated cupric sulfate, 0.38 gm./l. of iron substantially all of which was present as ferric sulfate and 0.23 gm./l. of zinc present as zinc sulfate. The solution had an initial pH of 2.7 and an initial relative EMF of about 0.1 volt, as measured by a conventional EMF measurement apparatus. Hydrogen sulfide was introduced into the leach liquor, and at the initial stage of hydrogen sulfide introduction the ferric sulfate was reduced to ferrous sulfate and a portion of the copper content of the solution was precipitated as cupric sulfide. After about 0.40 liter of gaseous hydrogen sulfide had been added to the solution, substantially all of the iron content of the solution had been reduced to the ferrous valence state and the relative EMF of the solution leveled off at about 0.45 volt, as indicated at point A in the drawing. The comparatively rapid increase in the EMF of the solution during the initial stage of addition of hydrogen sulfide thereto was due to the reduction of ferric iron to ferrous iron combined with the initial precipitation of copper sulfide. As the addition of hydrogen sulfide continued beyond point A, the precipitation of copper sulfide proceeded at a nearly constant relative EMF value until the precipitation of the cupric ions approached completion, as indicated at point B in the drawing, whereupon further small additions of hydrogen sulfide resulted in a very rapid increase in EMF of the solution. The sharp increase in the relative EMF of the solution that occurred at point B was readily detected through known techniques of EMF measurement.

Although the abrupt increase in the relative EMF of the solution that occurred at point B indicated that the precipitation of copper sulfide was essentially complete, an additional quantity of hydrogen sulfide was introduced into the solution to bring the relative EMF of the solution to about 1.22 volts, as indicated at point C in the drawing, whereupon the addition of hydrogen sulfide was temporarily interrupted. The pH of the solution was then increased to 3.8 by the addition of a base thereto to prepare the solution for the precipitation of zinc sulfide therefrom. (The reduction of the hydrogen ion concentration of the solution caused the relative EMF of the solution to drop to 0.98 as indicated at point D in the drawing, and to restore the relative EMF to the same value as at point C, the EMF measurement scale was arbitrarily adjusted as indicated at point E in the drawing.) The introduction of hydrogen sulfide into the solution was then resumed in order to precipitate zinc sulfide therefrom, and as zinc sulfide was precipitated and hydrogen ion concentration correspondingly increased, the relative EMF of the solution increased gradually until the precipitation of zinc ions approached completion, whereupon the EMF leveled off as indicated at point F in the drawing. The clearly defined change in the relative EMF (namely, the change from a gradually increasing EMF to an unchanging EMF) that occurred at point F was readily detected through known techniques of EMF measurement.

The process of the present invention may be employed to precipitate and recover copper and/or zinc sulfides from virtually all aqueous solutions containing recoverable amounts of ionizable water-soluble salts of these metals, and it is particularly useful for the recovery of copper and zinc from acidic, copper- and zinc-containing leach liquors such, for example, as low-grade mine water, dump leach effluents, heap leach liquors, slime pulps containing dissolved copper and the like, although the process is not limited to such liquors. When the recovery of zinc sulfide is contemplated from an aqueous solution containing water-soluble zinc salts and ferric ions, and the pH of the solution is below about 3.0, the initial introduction of hydrogen sulfide into the solution results in the reduction of ferric ions to the ferrous state, and the solution is then adjusted to a pH within the range of about 3.5 to about 5.5 to effect the precipitation of the zinc sulfide by the hydrogen sulfide. The temperature of the leach solution is not critical within the range of temperatures ordinarily encountered in commercial operations. Thus, we have successfully carried out the process of our invention at a temperature of 38° F. and at a temperature of 120° F., as well as at the more normal temperature of about 70° F., the only discernable effect upon the results obtained being unimportant differences in the settling and filtration rates of the copper sulfide and zinc sulfide precipitates obtained.

The process of our invention achieves substantially complete precipitation of the copper content and zinc content of the solution, with the maximum utilization of hydrogen sulfide as a reagent, while avoiding the physiological problems usually associated with the use of hydrogen sulfide gas. The sulfide precipitate obtained is self-flocculating, free-settling and filters very well. The precipitate may be recovered by filtration, by settling in gravity separators, by centrifugation, by conventional sulfide flotation techniques or by other liquid-solid separation techniques known to the art. The copper sulfide and zinc sulfide products thus obtained are then treated in the conventional manner to recover the copper and zinc content thereof in metallic form.

As previously mentioned, the procedural technique involved in our process comprises continuously measuring the EMF of the copper-containing and zinc-containing solution while continuously introducing hydrogen sulfide thereinto. As used herein and in the appended claims the term "continuously" is intended to apply not only to the substantially uninterrupted measurement of the solution EMF and addition of hydrogen sulfide thereto but also to the intermittent or periodic measurement of EMF and/or addition of hydrogen sulfide provided the EMF measurements are sufficiently frequent or are coordinated with the addition of hydrogen sulfide so that the addition of the gaseous reagent can be stopped when the abrupt change in solution EMF indicates that the precipitation of copper or zinc is substantially complete.

The following examples are illustrative but are not limitative of the practice of our invention.

EXAMPLE I

Butte dump leach effluent containing 0.91 gm./l. copper, 0.34 gm./l. zinc and 0.28 gm./l. iron, all present in the form of sulfates of these metals, was treated with hydrogen sulfide gas to precipitate the copper content thereof in accordance with the process of our invention. The initial leach liquor had a pH of 2.7 and a relative EMF of 0.09 volt. The temperature of the solution was 72° F. The theoretical quantity of hydrogen sulfide required to reduce the iron content of the solution from ferric iron to ferrous iron and to precipitate the copper content thereof in the form of cupric sulfide was calculated to be 0.5 liter, and this quantity of hydrogen sulfide gas was added gradually to the solution over a period of 6.5 minutes. When the hydrogen sulfide first was added to the solution the EMF of the solution increased rapidly to about 0.29 volt as the ferric ions were reduced to the ferrous state. On completion of this phase of the reaction about over-half of the theoretical quantity of hydrogen sulfide required had been added to the solution. As the addition of hydrogen sulfide continued the EMF of the solution substantially leveled off and increased only gradually to 0.32 volt at which time the total quantity of hydrogen sulfide theoretically required (0.5 liter) had been added to the solution. A further minor addition of hydrogen sulfide caused the EMF of the solution to increase abruptly to about 0.65 volt. On conclusion of the hydrogen sulfide addition, the pH of leach liquor was 1.8 and it contained 0.11 gram per liter copper. The precipitate was equivalent to 87.9% recovery of copper.

EXAMPLE II

Butte dump leach effluent containing 0.92 gm./l. copper, 0.22 gm./l. zinc and 0.30 gm./l. iron was treated with hydrogen sulfide in accordance with our process. Hydrogen sulfide was added gradually to the solution until the precipitation of copper was shown to be complete by the abrupt increase in the relative EMF of the solution. The initial pH of the solution was 2.7, and on completion of the addition of hydrogen sulfide thereto the pH of the solution was 1.8. The actual amount of hydrogen sulfide added to the solution was 0.480 liter which was very close to the theoretical quantity of 0.476 liter hydrogen sulfide which was calculated to be required to reduce the iron content of the solution to the ferrous valence state and to precipitate the copper content thereof as copper sulfide. The copper precipitate was readily separated from the solution, and it contained no detectable amount of zinc sulfide. The residual leach liquor contained 0.003 gm./l. copper, and the precipitate was equivalent to 99.7% recovery of copper.

EXAMPLE III

Butte leach dump effluent having an initial pH of 2.7 and containing 0.92 gm./l. copper, 0.25 gm./l. zinc, and 0.51 gm./l. iron was treated with hydrogen sulfide to precipitate copper sulfide therefrom in accordance with our process. When the precipitation of copper sulfide was complete, as indicated by the abrupt increase in the relative EMF of the solution, the introduction of hydrogen sulfide thereinto was terminated. The precipitated copper sulfide was removed from the treated solution by allowing the filtrate to settle for 15 minutes, followed by decanting a clear two liter aliquot from the settled slurry.

The pH of the clear aliquot was adjusted from 1.78 to 3.80 by the addition of concentrated ammonium hydroxide thereto. Following the adjustment of the pH, gaseous hydrogen sulfide was added to the solution at the rate of 0.44 liter per minute based on standard conditions. The temperature of the solution was 22° C., and mild agitation of the solution was employed during addition of the hydrogen sulfide gas. The relative EMF of the solution gradually increased as the solution became depleted in zinc ions and the hydrogen ion concentration of the solution increased, and this gradual increase in EMF continued until the zinc content of the solution had been substantially quantitatively precipitated therefrom in the form of zinc sulfide, whereupon the relative EMF of the solution leveled off at 1.26. The change in EMF (from a gradual increase to a level plateau) corresponded to point F in the accompanying drawing at which point all of the zinc had been precipitated from the solution. Analysis of the solution following the precipitation of the zinc sulfide therefrom showed that the solution was substantially completely free of zinc ions.

The change in the relative EMF of the solution that occurs when the precipitation of copper or zinc sulfide approaches completion is readily detected by conventional EMF measuring devices. Moreover, the change in the solution EMF thus detected may be employed to operate gas-flow control equipment which, when actuated, shuts off the flow of hydrogen sulfide into the solution. Thus, our invention contemplates the use of conventional EMF measuring devices to operate conventional gas-flow equipment to achieve automatic control over the introduction of hydrogen sulfide into the solution so that the addition of hydrogen sulfide will be halted when the precipitation of copper sulfide or zinc sulfide is substantially complete in accordance with the practice of our invention.

From the foregoing description of our new process for the recovery of copper and zinc from solutions containing these metals it will be readily seen that we have made an important contribution to the art to which our invention relates.

We claim:

1. Process for the recovery of copper and zinc sulfides separately from aqueous solutions containing water-soluble copper salts and water-soluble zinc salts which comprises adjusting the hydrogen ion concentration in the solution so that the pH of the solution is below about 3.5, continuously monitoring the electromotive force of the aqueous solution by measuring the EMF that exists between dissimilar electrodes immersed in said solution, introducing hydrogen sulfide into the aqueous solution to precipitate the copper content thereof in the form of copper sulfide, continuing the introduction of hydrogen sulfide into the solution until the EMF of the solution changes abruptly whereupon the addition of hydrogen sulfide is discontinued, recovering the precipitated copper sulfide from the aqueous solution, adjusting the hydrogen ion concentration of the aqueous solution so that the pH of the solution is within the range of about 3.5 to about 5.5, again introducing hydrogen sulfide into the aqueous solution to precipitate the zinc content thereof in the form of zinc sulfide, continuing the addition of hydrogen sulfide into the solution until the EMF of the solution changes abruptly whereupon the addition of hydrogen sulfide is discontinued, and recovering the precipitated zinc sulfide from the aqueous solution.

2. The process according to claim 1 in which the pH of the initial copper- and zinc-containing solution is below about 3.0.

3. Process for the recovery of copper sulfides from substantially zinc free aqueous solutions containing water-soluble copper salts which comprises adjusting the hydrogen ion concentration in the solution so that the pH of the solution is below about 4.0, continuously monitoring the electromotive force of the aqueous solution by measuring the EMF that exists between dissimilar electrodes immersed in said solution, introducing hydrogen sulfide into the aqueous solution to precipitate the copper contents thereof in the form of copper sulfide, continuing the introduction of hydrogen sulfide into the solution until the EMF of the solution sharply increases whereupon the addition of hydrogen sulfide is discontinued, and recovering the precipitated copper sulfide from the aqueous solution.

4. The process according to claim 3 in which the pH of the initial copper-containing solution is below about 3.5.

5. The process according to claim 3 in which the pH of the initial copper-containing solution is below about 3.0.

6. Process for the recovery of zinc sulfide from aqueous solutions containing water-soluble zinc salts which comprises adjusting the hydrogen ion concentration of the aqueous solution so that the pH of the solution is within the range of about 3.5 to about 5.5, continuously monitoring the electromotive force of the aqueous solution by measuring the EMF that exists between dissimilar electrodes immersed in said solution, introducing hydrogen sulfide into the aqueous solution to precipitate the zinc content thereof in the form of zinc sulfide, continuing the addition of hydrogen sulfide into the solution until the EMF of the solution changes abruptly whereupon the addition of hydrogen sulfide is discontinued, and recovering the precipitated zinc sulfide from the aqueous solution.

7. The process according to claim 6 in which the zinc-containing solution contains ferric ions, in which the initial pH of the zinc-containing solution is maintained below about 3.0 during the initial introduction of hydrogen sulfide into the solution whereby the ferric ions present in the solution are reduced to ferrous ions, following which the pH of the solution is adjusted to within the range of about 3.5 to about 5.5.

References Cited

UNITED STATES PATENTS

| | | | |
|---|---|---|---|
| 1,759,996 | 5/1930 | Parker | 23—230 XR |
| 2,020,918 | 11/1935 | Stutz et al. | 23—135 |
| 2,607,718 | 8/1952 | Suthard | 23—230 XR |
| 2,666,691 | 1/1954 | Robinson et al. | 23—230 XR |
| 3,031,267 | 4/1962 | Martin et al. | 23—230 XR |

EARL C. THOMAS, *Primary Examiner.*

BENNETT H. LEVENSON, *Assistant Examiner.*

U.S. Cl. X.R.

23—230; 204—1